May 25, 1965     F. L. WAY     3,184,872
MOVING PATTERN SIMULATOR
Filed Dec. 31, 1962     2 Sheets-Sheet 1

INVENTOR.
FREDERICK L. WAY
BY
his ATTORNEYS

INVENTOR.
FREDERICK L. WAY

3,184,872
MOVING PATTERN SIMULATOR
Frederick L. Way, Whitestone, N.Y., assignor to Mobilcolor, Inc., New York, N.Y.
Filed Dec. 31, 1962, Ser. No. 248,648
5 Claims. (Cl. 40—106.53)

This application is a continuation-in-part of my copending application for "Lighting Pattern Simulator" Serial No. 195,281, filed May 16, 1962.

This invention relates to apparatus for simulating moving patterns and, more particularly, a simulating apparatus providing a lighting arrangement which is controlled in a predetermined manner so as to simulate a moving object or a changing lighting pattern.

Frequently, it is desirable to provide an illuminated representation of a particular pattern which moves in a predetermined manner. Fireworks present an eye catching and esthetically attractive display, for example, but it is impossible from the standpoint of cost and safety to maintain a fireworks exhibition in continuous operation or in close proximity to the public. Advertising displays presenting a moving illuminated message or a changing pictorial representation have also been found to be highly effective in attracting and maintaining the interest of an observer. Displays of this type which have been devised thus far, however, have required a very large number of separate light bulbs, each mounted at a separate location on a display board and individually energized and deenergized in accordance with a complex control pattern. Moreover, such displays have generally been restricted to single color representations because, to adapt them to multicolored displays, the total number of light bulbs must be multiplied by the number of desired colors and correspondingly increased space and control equipment must be provided.

Accordingly, it is an object of the present invention to provide a new and improved lighting pattern simulator which effectively overcomes the above-mentioned disadvantages of present display devices.

Another object of the invention is to provide a new and improved lighting pattern simulator which is compact in structure and simple in operation but at the same time provides multicolored moving pattern displays.

A further object of the invention is to provide a new and improved lighting pattern simulator which is readily adaptable to provide any of a wide variety of moving light patterns.

These and other objects of the invention are attained by providing display members having a plurality of lighting element locations, a plurality of light-conducting optical fiber elements each having one end disposed at a corresponding lighting element location in the member, and means for illuminating the other ends of the optical fiber elements in predetermined time relation so as to provide a desired moving light pattern at the ends disposed in the member. In a particular embodiment the ends of the fiber elements remote from the member are disposed adjacent to a light source in a predetermined spatial relationship, and a member having light transmitting openings is interposed between these ends of the fiber elements and the light source and moved so as to illuminate the adjacent fiber elements in a particular sequence. Color variations may be introduced into the pattern by interposing another movable member containing various color filters between the light source and the adjacent ends of the fiber elements.

Further objects and advantages of the invention will be apparent from a reading of the following detailed description, taken in conjunction with the figures of the accompanying drawings, in which.

Figure 2:
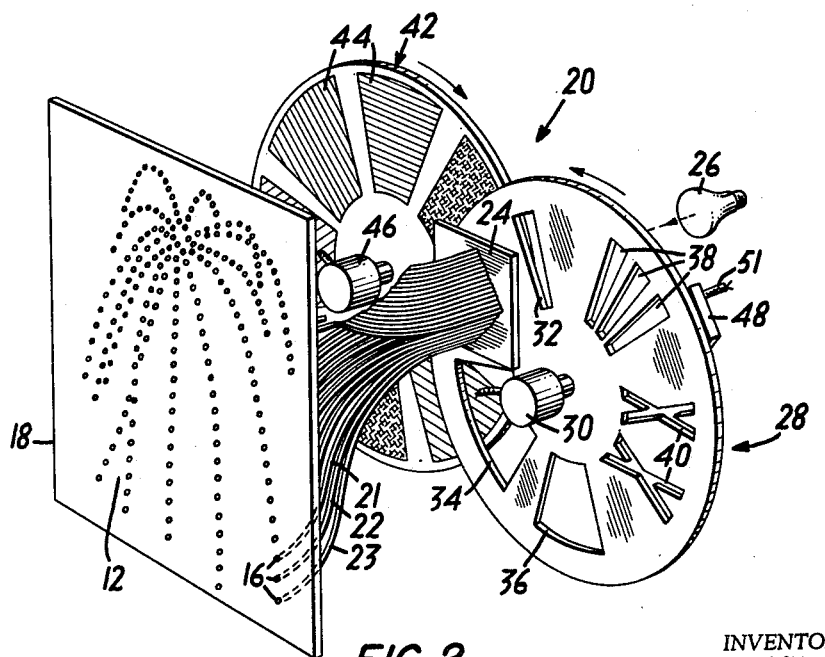
FIG. 2 is a fragmentary perspective view showing a portion of the display board illustrated in FIGURE 1 along with an exemplary embodiment of apparatus for producing a changing light pattern on the display board and for varying the color of the light in the pattern.
Figure 3A:
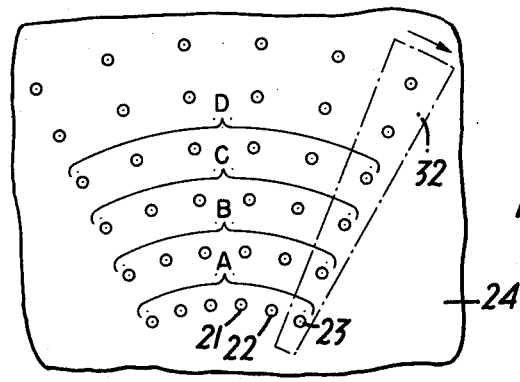
Figure 3B:
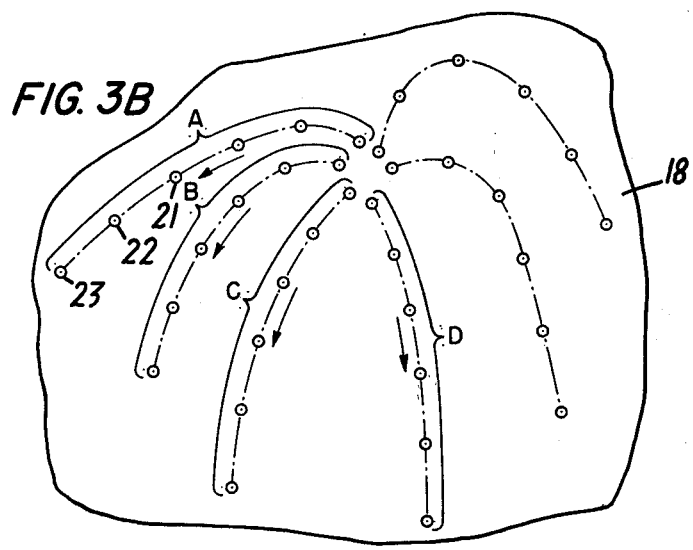
Figure 4:
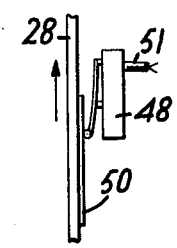

FIGS. 3A and 3B illustrate, respectively, the arrangement of the opposite ends of a group of light conducting fiber elements through which light is transmitted from a light source to a particular portion of the display board; and FIG. 4 is a fragmentary side view, on an enlarged scale, showing a switch arrangement for controlling the operation of a display device consisting of several units similar to that shown in FIGURE 2.

In my above-identified copending application a lighting pattern simulator is disclosed which simulates lighting arrangements in a simple and effective manner and is readily adaptable to modification in the lighting design. That simulator comprises an object having a plurality of lighting element locations and formed with perforations at selected lighting element locations to receive the ends of a plurality of light-conducting fiber elements, the other ends of the fiber elements being disposed adjacent to a light source at a location remote from the lighting element locations, so as to provide a selected lighting pattern on the object. By the present location, motion is imparted to a lighted pattern of that type by controlling the sequence of illumination of the fiber elements.

Figure 1:
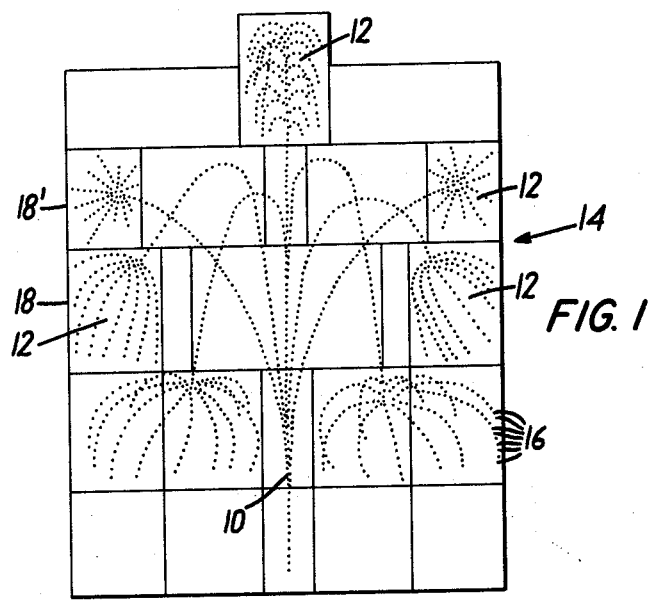
FIG. 1 is an elevational view of a representative embodiment of the invention wherein a display board is arranged to exhibit a simulated fireworks display.

In the typical embodiment of the invention shown in FIG. 1, a simulated fireworks display comprising a primary burst 10 and a number of secondary bursts 12 is presented on a display board 14. The board 14 has a large number of perforations 16 arranged in a selected pattern representing the paths of light traces which are produced by the various bursts, and each perforation is adapted to receive one end of a light conducting optical fiber element. For convenience, the display board 14 for large size displays is preferably made up of several component panels 18, 18', etc. of a size which can be transported and handled easily.

One of these panels, designated 18, is shown in the enlarged view of FIG. 2 along with the associated illumination control unit 20 consisting of a plurality of light conducting optical fibers 21, 22 and 23, one end of each of which is inserted into the perforations 16 in the panel 18. The other ends of the light conducting fibers 21, 22 and 23 are received in a support member 24 and are arranged therein in a particular spatial relation so that, when they are illuminated in sequence the desired motion of the light pattern appearing at the face of the panel 18 is obtained. One example of the arrangement of the fibers 21, 22 and 23 will be described in greater detail hereinafter.

Each of the fiber conductors 21, 22 and 23 is made of a highly transparent material which is preferably flexible in order to facilitate the construction and arrangement of the display device. Clear plastics such as Lucite and plexiglass are suitable for this purpose, but if a permanent installation is contemplated, the fibers may be made of a rigid transparent material such as glass. To prevent loss of light, the fiber conductors must have a higher refractive index than the surrounding medium. In most cases the higher index of glass or plastic material with respect to the air is sufficient. However, where the fiber conductors come into contact with each other as, for example, when rows of them are tightly packed in the support member 24, it is desirable to coat the contacting surfaces with a layer of material having a lower refractive index or with an opaque reflective material to prevent leakage between illuminated and non-illuminated fiber elements. The fiber conductors 21, 22 and 23 may, of course, be of various sizes depending on the size and the use of the display device in which they are installed. Generally, they will range from about 1/16 inch to 1/2 inch in diameter. The ends of the conductors 21, 22 and 23 may project a short distance out from the surface of the panel 18 so as to be visible at all angles or they may be flush with or slightly recessed into the surface to provide a limited angle of viewing. In many instances, frictional engagement of the fiber elements with the panel 18 will be sufficient to hold the ends in place in the openings 16, but in some cases it may be desirable to attach them to the panel by suitable clips or fasteners or by glue.

The ends of the conductors 21, 22 and 23 which are located in the support member 24 are illuminated by suitable light source 26 and, for large displays, this may be a high wattage floodlamp. In order to produce motion of the light pattern appearing on the panel 18, the sequence of illumination of the ends in the support means 24 is controlled. In the example shown in FIG. 2, an opaque disc 28, rotated by a drive motor 30, is interposed between the light source 26 and the support member 24. In order to control the illumination of the optical fibers, the disc 28 is formed with a plurality of openings 32, 34 and 36 or sets of openings 38 and 40 positioned to pass between the light source 26 and the support member 24. As these openings pass across the adjacent ends of the conductors 21, 22 and 23, the other ends of the conductors, located in the panel 18, are illuminated sequentially, the particular sequence depending upon the mounting arrangement in the member 24 and the geometric form of the openings in the disc 28. In order to produce moving patterns of various colors, the lighting mechanism 20 includes a color filter wheel 42 which also passes between the light source and the ends of the conductors 21, 22 and 23. The filter wheel 42 carries transparent filters 44 of various colors which are selectively interposed in the light beam from the light source 26 by rotating the filter wheel 42 such as by a drive motor 46.

The particular arrangement of the ends of the fiber conductors which produces the burst pattern shown in FIG. 2 will be readily understood from an examination of FIG. 3A, which represents a section of the support member 24 and FIG. 3B which shows a portion of the panel 18. In the member 24, the ends of the fibers which form each trace of the burst are arranged in a row extending parallel to the direction of motion of the opening 32 in the disc 28, the sequence of the fibers in the row corresponding to the desired direction of motion in the pattern, i.e., outward from the center of the burst as indicated by the arrows on the drawings. In the row and the corresponding trace designated by a reference A, for example, the last three fiber conductors 21, 22 and 23 are illuminated in succession by the slit 32 resulting in outward motion of the pattern at the end of the corresponding trace in the burst. Other rows of fibers corresponding to different traces in the burst are similarly arranged in the member 24, the various rows and corresponding traces being designated B, C, D etc.

It will be apparent from the foregoing that the particular pattern of illumination and the type of motion imparted thereto may be varied considerably by altering the geometric form of the openings in the disc 28. For example, the set of openings 38 shown in FIG. 2 will cause three traces of light to move out in the burst in rapid succession, such that, as the first burst nears its end, a second and then a third burst will be in the process of being traced. Each of X-shaped openings 40 will cause the traces of each burst to move out from the center at different times and also produce two separate bursts in some of the traces. The opening 36 in the disc 28 produces simultaneous bursts which are, however, made up of an illumination of several adjacent light conductors in each trace of the burst. By providing different shaped openings in succession in the disc 28, the shape of the illuminated pattern and the type of motion produced may be varied for successive illumination of the pattern. The particular examples illustrated in FIGURE 2 are, of course, only exemplary, and others will readily occur to those skilled in the art.

Furthermore, the selective illumination of the ends of the conductors by the light source 26 may be accomplished in other ways. For example, a continuous moving belt having suitable openings may be employed or a perforate strip may be wound from one roll to another across the beam of light. In any case, the disc 28 or other light interrupting arrangement may readily be removed and replaced by a different arrangement in order to alter the display program from time to time.

As indicated above, the panel 18 comprises only on portion of the display shown in FIG. 1 and it will be understood that each of the other burst patterns shown therein is produced in a similar manner, preferably utilizing a separate illumination control unit, although it will be apparent that the illumination of two or more groups of fibers may be controlled by openings in different portions of a single rotating disc. In some instances, however, a one-piece display board, or a display board composed of many panels, may have a number of associated lighting control units from which the light conductors extend to various parts of the display instead of terminating in closely adjacent portions of the display board.

Where several light control units such as the unit 20 are employed in the same display, it will generally be necessary to provide timing control equipment for initiating the movement of light patterns produced by the various units in a predetermined order. This may, of course, be accomplished in many ways. For example, the disc 28 of the unit 20 shown in FIG. 2 may have one or more associated electrical switches, such as the micro-switch 48 illustrated in FIG. 4. In the illustrated example, the micro-switch 48 is actuated by a projecting strip 50 mounted at a selected angular position on the disc 28, this switch is connected by a cable 51 to control the drive motor for the disc in one of the other light control units. When contacted by the strip 50 upon rotation of the disc 28, the switch 48 closes completing an electrical circuit to initiate operation of the motor in the other control unit. The color filter wheel 42 of the light control unit 20 may be controlled in a similar fashion according to the position of the disc 28, for example, or it may rotate continuously. Continuous rotation often provides striking colar variations in the complete burst and, depending on the respective rates of rotation of the filter wheels, can produce several random combinations of color in each burst.

In operation, the lighting pattern control unit for the primary burst 10 shown in FIG. 1, which is similar to the unit 20 shown in FIG. 2, is energized causing a slit similar to the slit 32 of FIG. 2 to pass between a light source and the adjacent ends of the light conducting optical fibers, the other ends of which are inserted into the display board 14 so as to form the traces of the primary burst. Consequently, the light pattern in the traces of the burst moves upwardly and outwardly until it reaches the centers of the secondary burst patterns 12, at which time a control switch like the switch 48 of FIG. 2 initiates operation of the disc drive motor 30 in each control unit 20 for the secondary burst. This moves the slit 32 past the adjacent ends of the fibers in the support member 24 producing the moving secondary burst pattern which has been described previously.

It will be understood by those skilled in the art that the above-described embodiment is susceptible of considerable variation and modification without departing from the spirit and scope of the invention. Instead of or in conjunction with pictorial displays, for example, handwritten messages could be traced out by arranging the light control system in an appropriate manner. Moreover, the intensity of the light illuminating the conductors may be varied as well as the color by including a suitable intensity modulator in the control unit 20. Also, for more complex types of pattern motion, two or more discs 28, having different types of openings and moving in different directions, may be interposed between the light source and the adjacent ends of the fiber conductors. Therefore, all such variations and modifications are included within the intended scope of the invention as defined by the following claims.

I claim:

1. A movable pattern simulator unit comprising display means having a plurality of lighting element locations arranged in a predetermined pattern, a plurality of light-conducting fiber means, one end of each of which is received in and extends from one of the lighting element locations on the display means, support means receiving the other ends of said light-conducting fiber means and retaining them in predetermined relation according to desired moving patterns on the display mean, light source means for illuminating said other ends of the light conducting fiber means, movable means interposed between the light source means and the fiber means, said movable means including a member having a first arrangement consisting of at least one opening therein arranged to transmit a first predetermined pattern of light in a first predetermined sequence to said plurality of light conducting fiber means and a second arrangement spaced from said first arrangement consisting of at least one opening therein arranged to transmit a second predetermined pattern of light in a second predetermined sequence to said plurality of light conducting fiber means, the second pattern and second sequence being substantially different from the first pattern and first sequence, respectively, and means including different colored light filters for providing a first color for the first pattern and a second color for the second pattern.

2. A moving pattern simulator unit according to claim 1 wherein the support means receiving said other ends of the light conducting fiber means is a substantially flat member, and wherein said other ends of said light conducting fiber means are received in said flat member in closely spaced relation and arranged in rows and columns.

3. A moving pattern simulator unit according to claim 2 wherein the movable member is a substantially flat disc mounted for rotation about an axis offset from the closely spaced other ends of the light conducting fiber means, and wherein said other ends are mounted in the support member in a plurality of columns lying in generally radial planes with respect to the axis of rotation of the rotatable member.

4. A moving pattern simulator unit according to claim 3 wherein the fiber elements are mounted in arcuate rows which are substantially concentric to the axis of rotation of the rotatable member.

5. A moving pattern simulator comprising first and second units, each of said units including a display means having a plurality of lighting element locations arranged in a predetermined pattern, a plurality of light conducting fiber means, one end of each of which extends from one of the lighting element locations on said display means, support means receiving the other ends of said light conducting fiber means and retaining them in selected relation according to a desired moving pattern on the display means, light source means for illuminating said other ends of said light conducting fiber means, movable means interposed between the light source means and the fiber means, said movable means including a member having a first arrangement consisting of at least one opening in the member arranged to transmit a first predetermined pattern of light in a first predetermined sequence to said other ends of said plurality of said light conducting fiber means, and a second arrangement spaced from said first arrangement consisting of at least one opening in the movable member arranged to transmit a second predetermined pattern of light in a second predetermined sequence to said other ends of said light conducting fiber means, said first pattern and first sequence being substantially different from said second pattern and second sequence, respectively, means including different colored light filters for providing a first color for said first predetermined pattern and a second color for said second predetermined pattern, and control means for initiating a pattern on the second unit at a predetermined time in the operation of the first unit.

References Cited by the Examiner

UNITED STATES PATENTS

| 982,685 | 1/11 | Medvecky et al. | 40—106.53 |
| 1,403,631 | 1/22 | Pyper | 40—106.53 |
| 2,507,909 | 5/50 | Kaysen | 40—130 |
| 2,639,528 | 5/53 | Medvecky et al. | 40—130 |

JEROME SCHNALL, *Primary Examiner.*